(12) United States Patent
Caputo et al.

(10) Patent No.: US 11,551,506 B2
(45) Date of Patent: Jan. 10, 2023

(54) SENSORY INDICATIONS FOR FUTURE GAME EVENTS FOR MULTIPLE PLAYERS OF A WAGERING GAME

(71) Applicant: IGT, Las Vegas, NV (US)

(72) Inventors: Scott Caputo, Fremont, CA (US); Fayez Idris, Dieppe (CA); Bethany Trainor, Dieppe (CA); Paolo Werbrouck, Palo Alto, CA (US)

(73) Assignee: IGT, Las Vegas, NV (US)

( * ) Notice: Subject to any disclaimer, the term of this patent is extended or adjusted under 35 U.S.C. 154(b) by 71 days.

(21) Appl. No.: 16/921,016

(22) Filed: Jul. 6, 2020

(65) Prior Publication Data

US 2021/0049860 A1    Feb. 18, 2021

Related U.S. Application Data

(63) Continuation of application No. 15/851,927, filed on Dec. 22, 2017, now abandoned.

(51) Int. Cl.
| | |
|---|---|
| *G07F 17/32* | (2006.01) |
| *G06F 3/01* | (2006.01) |
| *G08B 7/06* | (2006.01) |

(52) U.S. Cl.
CPC .......... *G07F 17/3211* (2013.01); *G06F 3/012* (2013.01); *G06F 3/016* (2013.01); *G07F 17/3244* (2013.01); *G07F 17/3272* (2013.01); *G08B 7/06* (2013.01)

(58) Field of Classification Search
CPC ............. G07F 17/3211; G07F 17/3295; G07F 17/3206; G07F 17/3227; G07F 17/3255; G07F 17/3274; G07F 17/3288; G07F 17/3267; G07F 17/323; G07F 17/3239; A63F 13/424; A63F 13/215; A63F 13/537; A63F 2300/1081
See application file for complete search history.

(56) References Cited

U.S. PATENT DOCUMENTS

| | | | |
|---|---|---|---|
| 8,721,416 B2 | 5/2014 | Grant et al. | |
| 8,827,805 B1* | 9/2014 | Caporusso | G07F 17/3204 463/35 |
| 2003/0036430 A1* | 2/2003 | Cannon | G07F 17/3244 463/42 |
| 2003/0119576 A1 | 6/2003 | McClintic et al. | |
| 2010/0113131 A1* | 5/2010 | Aoki | G07F 17/32 463/20 |

(Continued)

*Primary Examiner* — Thomas H Henry
(74) *Attorney, Agent, or Firm* — Sage Patent Group

(57) ABSTRACT

A computer-implemented method includes providing a real-time environmental model of a shared virtual environment (SVE) that includes a plurality of virtual players. Display data corresponding to the SVE is transmitted to each player device. The data includes user display data that causes a display in the player device to render a portion of the SVE based on a virtual orientation of the player device and a virtual location of the virtual player in the SVE. Sensory feedback data is then transmitted to the plurality of VR devices that causes each VR device to provide a sensory indication associated with the SVE to the respective player. The sensory indication is indicative of a benefit that will be provided to a subset of the plurality of players at a predetermined future time. At the predetermined future time, the benefit is then provided to the subset of the plurality of players.

16 Claims, 7 Drawing Sheets

(56) References Cited

U.S. PATENT DOCUMENTS

| | | | |
|---|---|---|---|
| 2010/0160016 A1* | 6/2010 | Shimabukuro | G07F 17/3211 463/16 |
| 2010/0311494 A1* | 12/2010 | Miller | G07F 17/3223 463/22 |
| 2013/0281209 A1* | 10/2013 | Lyons | A63F 13/53 463/33 |
| 2015/0119130 A1* | 4/2015 | Lovitt | A63F 13/67 463/23 |
| 2015/0221183 A1* | 8/2015 | Colvin | G07F 17/3211 463/11 |
| 2017/0300116 A1 | 10/2017 | Lyons et al. | |

* cited by examiner

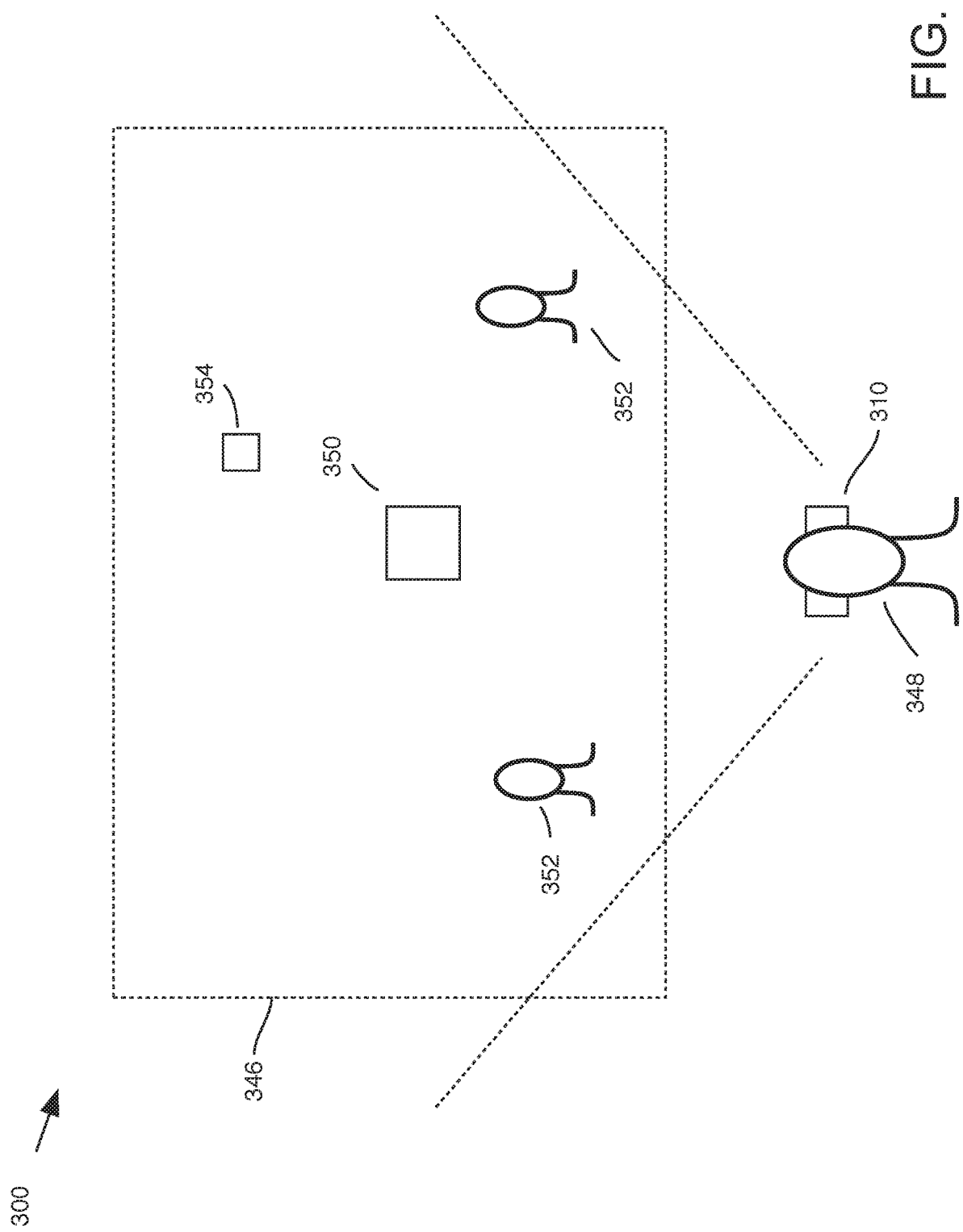

SENSORY INDICATIONS FOR FUTURE GAME EVENTS FOR MULTIPLE PLAYERS OF A WAGERING GAME

PRIORITY

This application is a continuation of, and claims priority to and the benefit of, U.S. patent application Ser. No. 15/851,927, which was filed Dec. 22, 2017, the entire contents of which is incorporated by reference herein.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to future game events for a wagering game, and in particular to sensory indications of future game events for multiple players of a wagering game.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Advances in technology have significantly changed the characteristics of products offered by the gaming industry and associated effects on user experiences. Virtual reality and augmented reality gaming involves using innovative 3-D computer-based formats with high resolution graphics that immerse the player into an interactive gaming environment as an enhancement to or a replacement of a real-world scene. Virtual reality and augmented reality technologies may enable innovative and immersive player experience.

SUMMARY

A computer-implemented method according to some embodiments includes providing a real-time environmental model of a shared virtual environment (SVE) that includes a plurality of virtual players, each of the plurality of virtual players being associated with a respective player of a plurality of players of a wagering game. The method further comprises, for each of the plurality of virtual players, transmitting display data corresponding to the SVE to a player device that is associated with the respective player, the data including user display data that causes a display in the player device to render a portion of the SVE based on a virtual orientation of the player device and a virtual location of the virtual player in the SVE. The method further comprises transmitting sensory feedback data to the plurality of VR devices that causes each VR device to provide a sensory indication associated with the SVE to the respective player, wherein the sensory indication is indicative of a benefit that will be provided to a subset of the plurality of players at a predetermined future time. The method further comprises, at the predetermined future time, providing the benefit to the subset of the plurality of players.

According to another embodiment, the player device comprises a display device, and the sensory indication is a visual indication provided to the display device.

According to another embodiment, the visual indication comprises a graphical element moving from a first location in the SVE to a second location in the SVE, and the second location is closer to the location of the virtual player than the first location.

According to another embodiment, the visual indication is an approaching cloud, a group of fairies, a jazz band, a swarm of bees, or a herd of wild animals.

According to another embodiment, the player device comprises an audio device, and the sensory indication is an audio indication provided to the audio device.

According to another embodiment, the audio element comprises a sound having a first volume at a first time and a second volume louder than the first volume at a second time, wherein the second time is after the first time and before the predetermined future time.

According to another embodiment, the audio element is a three-dimensional audio element that simulates a source location in the SVE for the audio element.

According to another embodiment, the audio element comprises one of a sound effect or a musical cue.

According to another embodiment, the player device comprises a haptic feedback device, and the sensory indication is a haptic indication provided to the haptic feedback device.

According to another embodiment, the haptic indication comprises one of a tactile element, a pressure element, a vibration element, or a temperature change element.

According to another embodiment, the player device comprises a virtual reality (VR) display configured to provide the sensory indication so that the player perceives the sensory indication as being associated with a virtual location in the SVE in a VR scene in a field of view of the player.

According to another embodiment, the player device comprises an augmented reality (AR) display configured to provide the sensory indication so that the player perceives the sensory indication as being associated with a location in a real-world scene in a field of view of the player.

According to another embodiment, the method further comprises randomly selecting the subset of players to which the benefit will be provided.

According to another embodiment, the method further comprises selecting the subset of players to which the benefit will be provided based on the play activity of the wagering game by the subset of players.

According to another embodiment, the method further comprises providing a second benefit to a second subset of players associated with the first subset of players at the predetermined future time.

According to another embodiment, a gaming system comprises a memory and a processor coupled to the memory. The processor is configured to perform a method comprising providing a real-time environmental model of a shared virtual environment (SVE) that includes a plurality of virtual players, each of the plurality of virtual players being associated with a respective player of a plurality of players of a wagering game. The method further comprises, for each of the plurality of virtual players, transmitting display data corresponding to the SVE to a player device that is associated with the respective player, the data including user display data that causes a display in the player device to render a portion of the SVE based on a virtual orientation of the player device and a virtual location of the virtual player in the SVE. The method further comprises transmitting sensory feedback data to the plurality of VR devices that causes each VR device to provide a sensory indication associated with the SVE to the respective player, wherein the sensory indication is indicative of a benefit that will be provided to a subset of the plurality of players at a predetermined future time. The method further comprises, at the predetermined future time, providing the benefit to the subset of the plurality of players.

According to another embodiment, the player device comprises a display device, and the sensory indication is a visual indication provided to the display device.

According to another embodiment the player device comprises an audio device, and the sensory indication is an audio indication provided to the audio device.

According to another embodiment the player device comprises a haptic feedback device, and the sensory indication is a haptic indication provided to the haptic feedback device.

According to another embodiment a non-transitory computer-readable medium comprises machine-readable instructions configured to cause a processor to perform a method. The method comprises providing a real-time environmental model of a shared virtual environment (SVE) that includes a plurality of virtual players, each of the plurality of virtual players being associated with a respective player of a plurality of players of a wagering game. The method further comprises, for each of the plurality of virtual players, transmitting display data corresponding to the SVE to a player device that is associated with the respective player, the data including user display data that causes a display in the player device to render a portion of the SVE based on a virtual orientation of the player device and a virtual location of the virtual player in the SVE. The method further comprises transmitting sensory feedback data to the plurality of VR devices that causes each VR device to provide a sensory indication associated with the SVE to the respective player, wherein the sensory indication is indicative of a benefit that will be provided to a subset of the plurality of players at a predetermined future time. The method further comprises, at the predetermined future time, providing the benefit to the subset of the plurality of players.

BRIEF DESCRIPTION OF THE DRAWINGS

FIG. 3 is a schematic diagram illustrating a view of a shared virtual environment (SVE) from the perspective of a player according to some embodiments.

DETAILED DESCRIPTION

Embodiments described herein relate to future game events for a wagering game, and in particular to sensory indications of future game events for multiple players of a wagering game. According to some embodiments, a computer-implemented method includes providing a real-time environmental model of a shared virtual environment (SVE) that includes a plurality of virtual players, each of the plurality of virtual players being associated with a respective player of a wagering game. For each of the plurality of virtual players, display data corresponding to the SVE is transmitted to a player device that is associated with the respective player. The data includes user display data that causes a display in the player device to render a portion of the SVE based on a virtual orientation of the player device and a virtual location of the virtual player in the SVE. Sensory feedback data is then transmitted to the plurality of VR devices that causes each VR device to provide a sensory indication associated with the SVE to the respective player. The sensory indication is indicative of a benefit that will be provided to a subset of the plurality of players at a predetermined future time. At the predetermined future time, the benefit is then provided to the subset of the plurality of players.

When interacting with the SVE, players may be visually represented to other players by an avatar or other graphical object that represents the player. As used herein, when a player is referred to as performing some task and/or operation in the SVE, it will be understood that the player is providing an input that causes the player's corresponding avatar to perform the task and/or operation in the SVE. These and other embodiments are discussed in detail below.

Gaming Systems and Player Devices

Figure 1:
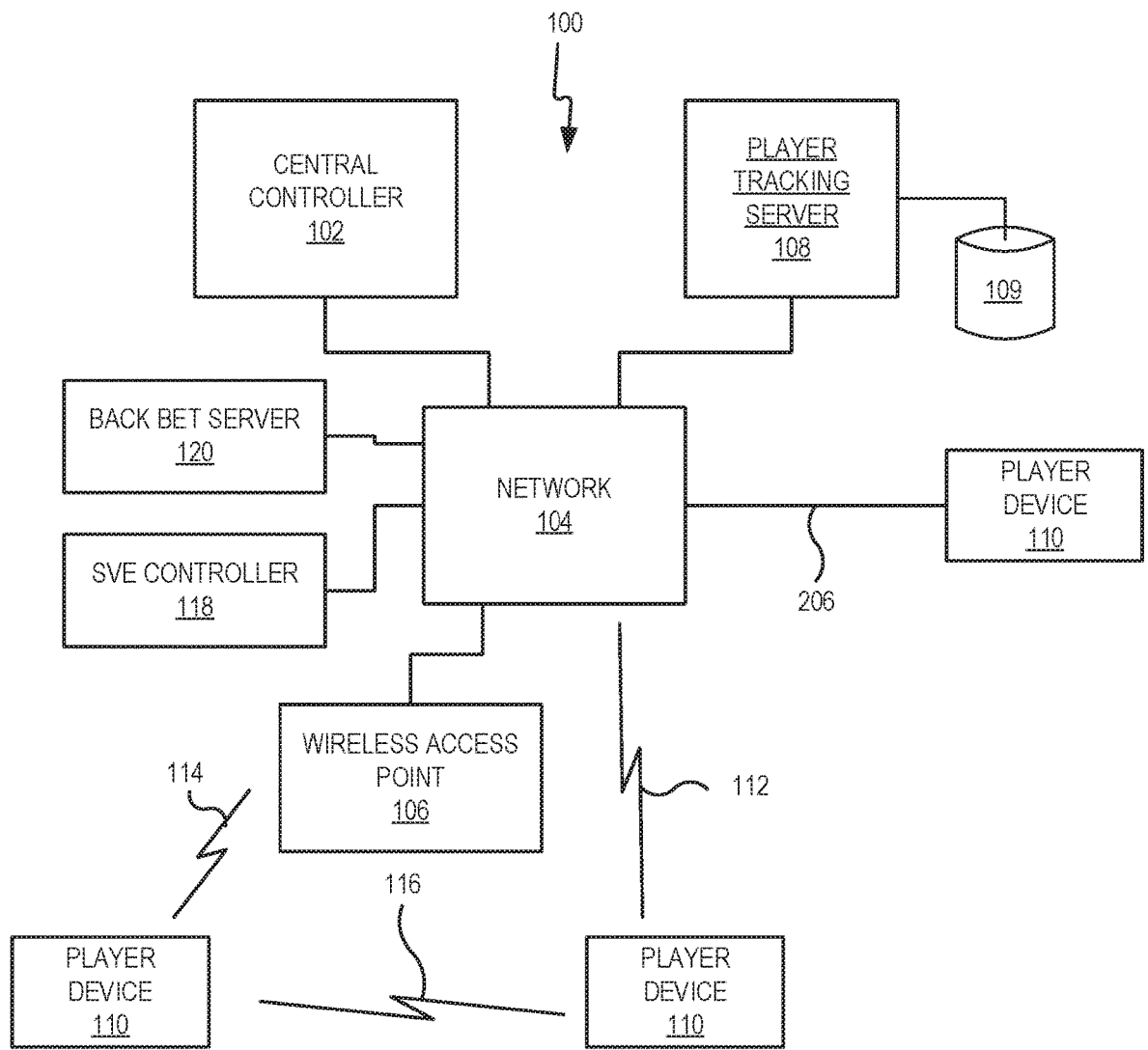
FIG. 1 is a schematic block diagram illustrating a network configuration for a plurality of gaming devices according to some embodiments.

Referring to FIG. 1, a gaming system 100 is illustrated. The gaming system 100 may be located, for example, on the premises of a gaming establishment, such as a casino. System components may be in communication with each other and/or at least one central controller 102 through a data network or remote communication link 104. The data communication network 104 may be a private data communication network that is operated, for example, by the gaming facility. Communications over the data communication network 104 may be encrypted for security. The central controller 102 may be any suitable server or computing device which includes at least one processor and at least one memory or storage device. The processor of the central controller 102 is configured to transmit and receive events, messages, commands or any other suitable data or signal between the central controller 102 and any of the other system components. In some embodiments, one or more of the functions of one or more other system components as disclosed herein may be performed by the central controller 102.

A wireless access point 106 provides wireless access to the data communication network 104. The wireless access point 106 may be connected to the data communication network 104 as illustrated in FIG. 1, or may be connected directly to the central controller 102 or another server connected to the data communication network 104.

A player tracking server 108 may also be connected through the data communication network 104. The player tracking server 108 may manage a player tracking account that tracks the player's gameplay and spending and/or other player preferences and customizations, manages loyalty awards for the player, manages funds deposited or advanced on behalf of the player, and other functions. Player information managed by the player tracking server 108 may be stored in a player information database 109.

As further illustrated in FIG. 1, a player device 110 is provided. In some embodiments, the player device 110 may be a virtual reality (VR) device or an augmented reality (AR)

device. The player device 110 communicates with one or more elements of the system 100 to render two-dimensional (2D) and/or three-dimensional (3D) content that corresponds to a shared virtual environment (SVE) to one or more players. That is, the player device 110 provides virtual images corresponding to the SVE to the players. In some embodiments, the player device 110 may be further configured to enable the player to interact with virtual objects displayed to the player by the player device 110.

The player device 110 communicates with one or more elements of the system 10 to coordinate the rendering of virtual reality images, sounds, and/or tactile outputs that correspond to the SVE to the player. For example, in some embodiments, the player device 110 may communicate directly with the network 104 (and the devices connected thereto) over a wireless interface 112, which may be a WiFi link, a Bluetooth link, an NFC link, etc. In some embodiments, the player device 110 may communicate directly with the network 104 (and the devices connected thereto) over a wired interface 116. In other embodiments, the player device 110 may communicate with the data communication network 104 (and devices connected thereto) over a wireless interface 114 with the wireless access point 106. The wireless interface 114 may include a WiFi link, a Bluetooth link, an NFC link, etc. In still further embodiments, multiple player devices 110 may communicate simultaneously with the network 104 (and devices connected thereto) over the wireless interface 112, the wireless access point 106 over the wireless interface 114 and/or the wired interface 116. In these embodiments, the wireless interface 112, the wireless interface 114 and the wired interface 116 may use different communication protocols and/or different communication resources, such as different frequencies, time slots, spreading codes, etc. For example, in some embodiments, the wireless interface 112 may be a Bluetooth link, while the wireless interface 114 may be a WiFi link.

The interfaces 112, 114, 116 allow the player device 110 to coordinate the generation and/or rendering of sensory indications, such as images, sounds, and/or haptic outputs to multiple different players via corresponding player devices 110.

In some embodiments, the gaming system 100 includes an SVE controller 118. The SVE controller 118 may be a computing system that communicates through the data communication network 104 with the player devices 110 to coordinate the generation and rendering of virtual reality images, sounds and/or tactile outputs to one or more players using the player devices 110. The SVE controller 118 may be implemented within or separately from the central controller 102.

In some embodiments, the SVE controller 118 may coordinate the generation and display of the virtual images of the same virtual object to more than one player by more than one player device 110. As described in more detail below, this may enable multiple players to interact with the same virtual object and with each other together in real time in the SVE. This feature can be used to provide a shared multiplayer experience to multiple players at the same time.

Moreover, in some embodiments, the SVE controller 118 may coordinate the generation and display of the same virtual object, sound and/or tactile output to players that are at different physical locations, as will be described in more detail below.

The SVE controller 118 may generate and/or store a three dimensional wireframe map of a gaming area, and may provide the three dimensional wireframe map to the player devices 110. The wireframe map may store various information about the game elements in the SVE, such as the identity, type and relative location of the game elements. The three-dimensional wireframe map may enable an VR device 110 to more quickly and accurately determine its virtual position and/or orientation within the SVE, and may enable the player device 110 to assist the player in navigating the SVE while using the player device 110.

In some embodiments, at least some processing of virtual images, objects, sounds and/or haptic outputs that are rendered by the player devices 110 may be performed by the SVE controller 118, thereby offloading at least some processing requirements from the player devices 110.

A back bet server 120 may be provided to manage back bets placed using a player device 110 as described in more detail below. A player device 110 may communicate with the back bet server 120 through the wireless interface 114 and network 104.

Figure 2:
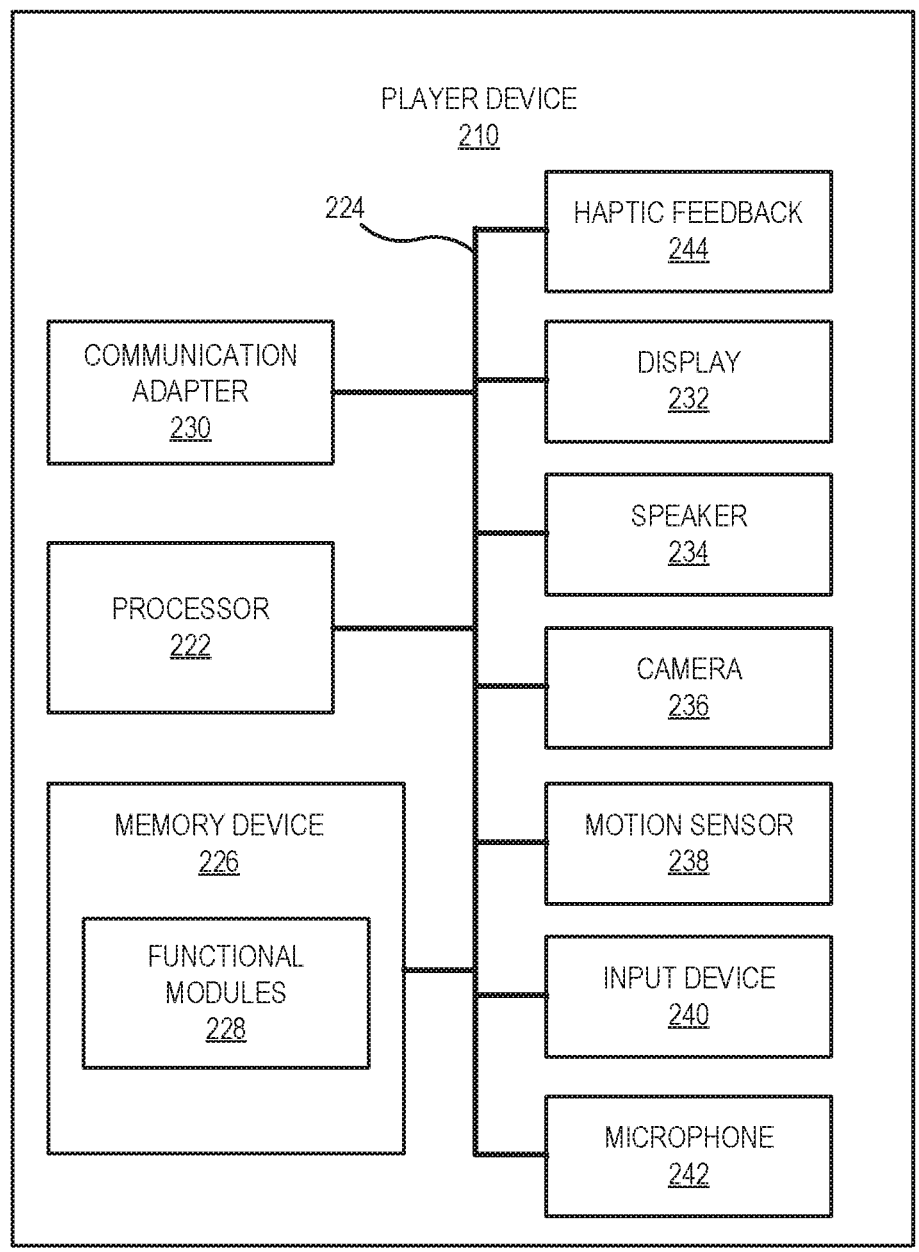
FIG. 2 is a block diagram that illustrates various components of a player device according to some embodiments.

Reference is now made to FIG. 2, which is a block diagram that illustrates various components of a player device 210, similar to the player device 110 of FIG. 1, according to some embodiments. As shown in FIG. 2, the player device 210 may include a processor 222 that controls operations of the player device 210. Although illustrated as a single processor, multiple special purpose and/or general purpose processors and/or processor cores may be provided in the player device 210. For example, the player device 210 may include one or more of a video processor, a signal processor, a sound processor and/or a communication controller that performs one or more control functions within the player device 210. The processor 222 may be variously referred to as a "controller," "microcontroller," "microprocessor" or simply a "computer." The processor 222 may further include one or more application-specific integrated circuits (ASICs).

Various components of the player device 210 are illustrated in FIG. 2 as being connected to the processor 222. It will be appreciated that the components may be connected to the processor 222 and/or each other through one or more busses 224 including a system bus, a communication bus and controller, such as a USB controller and USB bus, a network interface, or any other suitable type of connection.

The player device 210 further includes a memory device 226 that stores one or more functional modules 228 for performing the operations described above.

The memory device 226 may store program code and instructions, executable by the processor 222, to control the player device 210. The memory device 226 may include random access memory (RAM), which can include non-volatile RAM (NVRAM), magnetic RAM (ARAM), ferroelectric RAM (FeRAM) and other forms as commonly understood in the gaming industry. In some embodiments, the memory device 226 may include read only memory (ROM). In some embodiments, the memory device 226 may include flash memory and/or EEPROM (electrically erasable programmable read only memory). Any other suitable magnetic, optical and/or semiconductor memory may operate in conjunction with the gaming device disclosed herein.

The player device 210 may include a communication adapter 230 that enables the player device 210 to communicate with remote devices, such as the wireless network (such as the wireless network 104 of FIG. 1), another player device 210, and/or a wireless access point (such as the wireless access point 106 of FIG. 1), over a wired and/or wireless communication network, such as a local area network (LAN), wide area network (WAN), cellular communication network, or other data communication network.

The player device 210 may include one or more internal or external communication ports that enable the processor 222 to communicate with and to operate with internal or external peripheral devices, such as displays 232, speakers 234, cameras 236, sensors, such as motion sensors 238, input devices 240, such as keyboards, pointer devices, and/or keypads, mass storage devices, microphones 242, haptic feedback devices 244 and wireless communication devices. In some embodiments, internal or external peripheral devices may communicate with the processor through a universal serial bus (USB) hub (not shown) connected to the processor 222. Although illustrated as being integrated with the player device 110, any of the components therein may be external to the player device 210 and may be communicatively coupled thereto. Although not illustrated, the player device 210 may further include a rechargeable and/or replaceable power device and/or power connection to a main power supply, such as a building power supply.

In some embodiments, the player device 210 may include a head mounted device (HMD) and may include optional wearable add-ons that include one or more sensors and/or actuators. Including ones of those discussed herein. For example, the player device 210 may be a head-mounted virtual-reality (VR) device configured to provide a fully immersive SVE for a player wearing the player device 210. Alternatively, the player device 210 may be a head-mounted augmented-reality (AR) (also referred to as mixed-reality) device configured to provide elements of the SVE as part of a real-world scene being viewed by the player wearing the player device 210.

Reference is now made to FIG. 3, which is a schematic diagram illustrating a view of multiple players in a shared virtual environment (SVE) as part of a gaming system 300, similar to the gaming system 100 of FIG. 1, according to some embodiments. As illustrated, the SVE 346 is a virtual environment that is provided to the players 348 via the player devices 310, similar to the player devices 110 and 210 of FIGS. 1 and 2. Within the SVE 346, the players 348 may be represented by avatars or other virtual objects. The players 348 may communicate with other players 348 in the SVE 346 in real-time. For example, a first player 348 may talk to a second player 348 during the shared experience in the SVE 346. Some embodiments provide the player 348 may see each other in the SVE 346 by virtue of their respective avatars.

The SVE 346 may include a plurality of virtual game elements 350 that may be played by the players 348 in the SVE 346. The player devices 310 may include inputs for the players 348 to interact with virtual game elements 350 within the SVE 346. A player 348 may hear and see another player 348 playing a virtual game elements 350 in the SVE 346. While the players 348 are playing together virtually in the SVE 346, in reality, each of the players 348 may be in completely different geographical locations. For example, among players 348 that are playing virtual game elements 350 together in the SVE 346, one player 348 may be in a casino while another player 348 may be at his or her home that may be at a different address from the casino and/or in a different city, state, country and/or continent.

Some embodiments provide that when one of the players 348 triggers a bonus round during a game, the SVE controller (similar to the SVE controller 118 of FIG. 1) may transport the player 348 into a bonus SVE that is different than the SVE 346. The theme of the virtual game element 350 and/or SVE 346 may be tied to any theme including a theme unique to a particular EGM, unique to a casino operator, and/or unique to a licensed property, such as an entertainment industry franchise.

In the example of FIG. 3, the SVE 346 includes a plurality of virtual players 352 located within the SVE 346, with each virtual player 352 corresponding to a player 348 wearing a player device 310. Display data is transmitted by the SVE controller to the respective player devices 310 to render a portion of the SVE 346 based on a virtual orientation of the respective player device 310 and a virtual location of the virtual player 352 in the SVE 346. In anticipation of a future benefit to be provided to a subset (i.e., one or more) of the players 348 at a predetermined future time, such as a bonus game, a progressive jackpot, or another award, a sensory indication is provided to each of the players 348 to indicate the upcoming benefit. In this example, the sensory indication is a visual indication 354 that is visible to the players 348 within the SVE 346. In addition to the visual indication 354, or as a substitute for the visual indication 354, other types of sensory indications, such as an audio indication, such as a sound effect and/or a musical cue, and/or a haptic indication, such as a tactile element, a pressure element, a vibration element, and/or a temperature change element, may be provided.

Examples of the different types of sensory indications that may be provided include visual indications such an approaching cloud with sound and vibration feedback to simulate rumbling thunder, a cloud of giggling fairies, a roaming jazz band, a swarm of bees, a herd of wild animals (e.g., hippos, horses, buffalo, dinosaurs, etc.) or any other realistic and/or fanciful effect. In some examples, the visual, audio, and/or haptic elements may "move" with respect to the subset of players 348 that are to receive the benefit, such as moving from a first location in the SVE 346 to a second location within the SVE 346 that is closer to a virtual location of the virtual player(s) 352 within the SVE 346. For the example of an approaching cloud, the visual indication 354 of the cloud may appear to grow in size as it gets closer to the virtual player 352, and the audio indication and haptic indication may increase in volume and/or amplitude. The audio indication may also be a three-dimensional e.g., stereoscopic, audio element, that simulates a source location in the SVE 346 for the audio indication with respect to the virtual player 352.

The subset of players 348 to which the benefit will be provided may be randomly selected, and/or may be based on the play activity of the wagering game by one or more of the subset of players 348. For example, the subset of players 348 who bet higher or who have a higher player tracking status may be selected more often. The visual indication 354 may also appear based on triggers in the games the players 348 are playing. For example, any time any player triggers a bonus, the visual indication 354 might appear and bestow a benefit on one or more players 348. In one embodiment, the benefits bestowed are a progressive jackpot or entrance into a jackpot bonus or entrance into a bonus or a multiplier for the next wagered spin or a number of free spins or a casino comp or any other benefit.

A second benefit may also be provided to a second subset of players 348 associated with the first subset of players 348 at the predetermined future time. For example, a group of players 348 proximate to the first subset of players 348 may receive the secondary benefit. In one embodiment, a benefit is always bestowed on at least one player when the visual indication 354 appears. In another embodiment, the visual indication 354 is not guaranteed to bestow any benefits on any players when it appears. In yet another embodiment, the visual indication 354 may make several passes, getting closer and closer, and eventually bestow a benefit on each player. In still another embodiment, if the visual indication 354 doesn't bestow a benefit on any player one time, the visual indication 354 or other sensory indication is larger and/or the benefit is larger next time.

In one embodiment, the visual indication 354 may be one or more different roaming characters that can appear which may each bestow different benefits. In one embodiment, only one roaming character appears at a time. In another embodiment, multiple different types of roaming characters can appear at the same time. In one embodiment, the speed and vigor of the roaming character(s) is affected by the rate of play of the players.

As noted above, the player device 310 may be a VR device having a VR display configured to provide the sensory indication so that the player 348 perceives the sensory indication as being associated with a virtual location in the SVE 346 in a VR scene in a field of view of the player 348. The player device 310 may alternatively be an AR device having an AR display configured to provide the sensory indication so that the player 348 perceives the sensory indication as being associated with a location in a real-world scene in a field of view of the player 348.

Figure 4A:
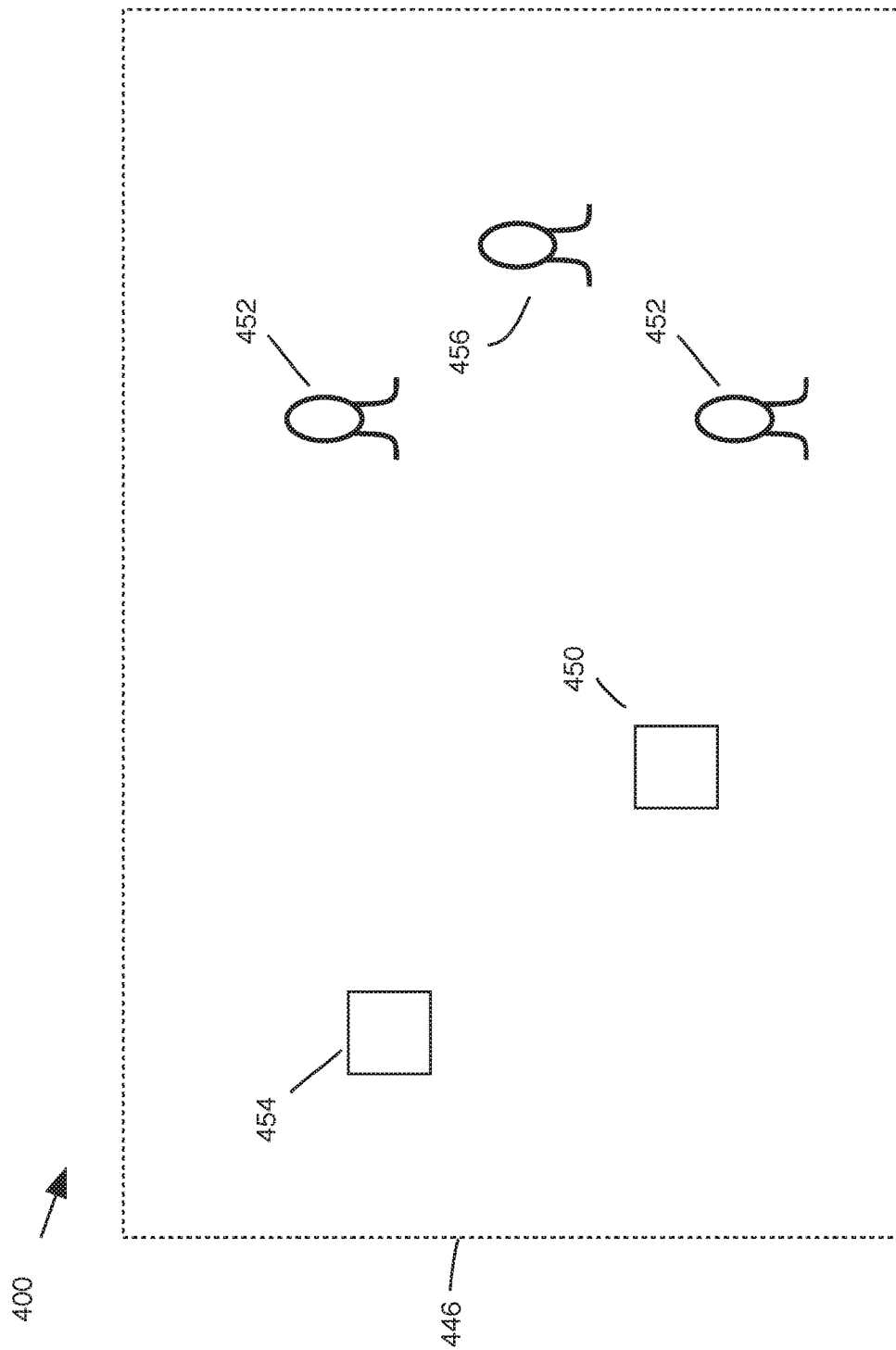
FIGS. 4A and 4B are schematic diagrams illustrating a view of multiple players in a shared virtual environment (SVE), similar to the SVE of FIG. 3, according to some embodiments.
Figure 4B:
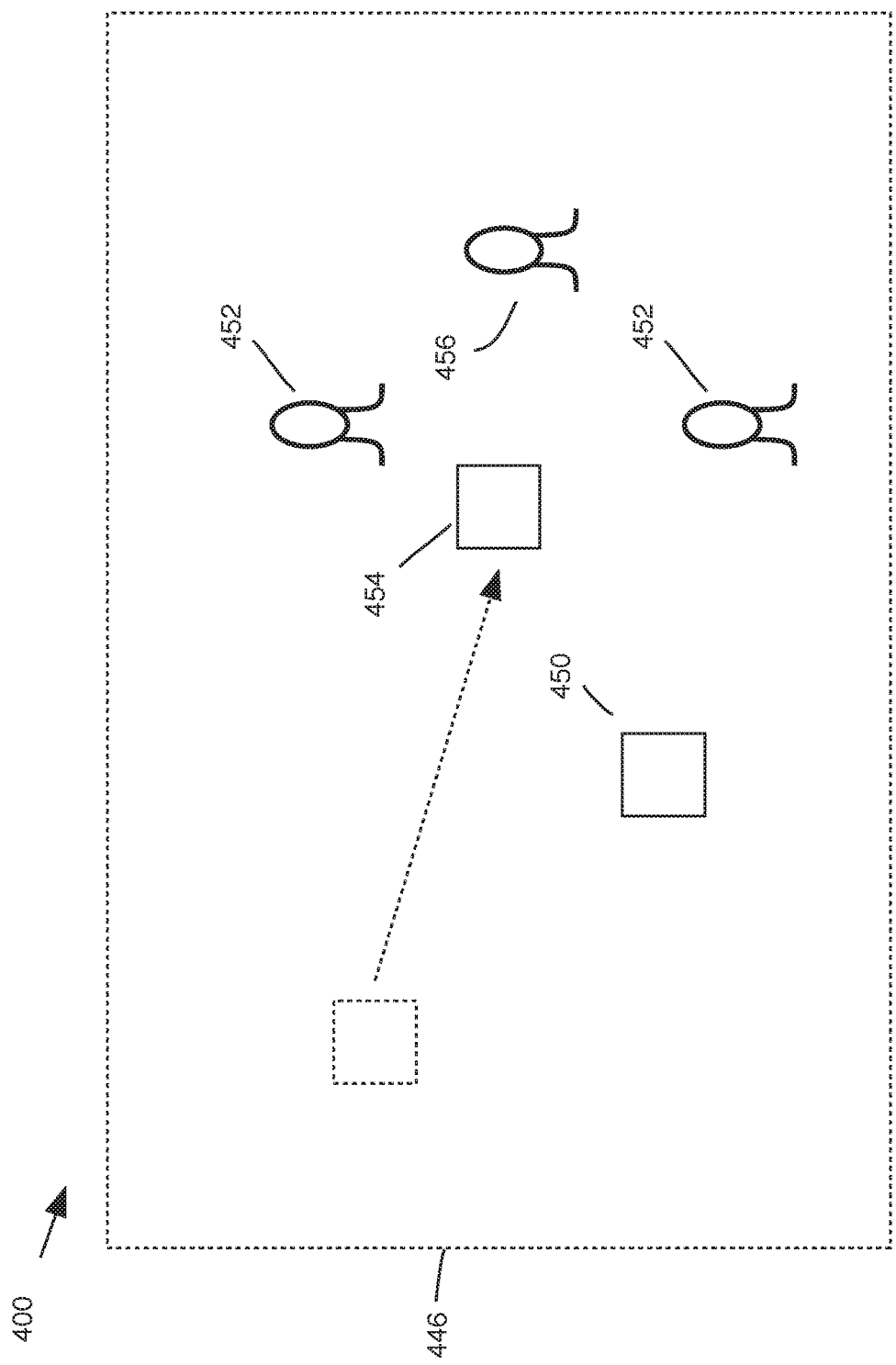

Reference is now made to FIGS. 4A and 4B, which are schematic diagrams illustrating a view of a gaming system 400 having multiple virtual players 452 in a shared virtual environment (SVE) 446, similar to the SVE 346 of FIG. 3. The views shown in FIGS. 4A and 4B are top-down views of the SVE 446 and may correspond to a spectator view or administrator view, but do not necessarily correspond to a view of any particular player wearing a player device. In this example, virtual players 452, 456 are located at particular locations within the SVE 446, along with one or more virtual game elements 450. In this embodiment, the player associated with virtual player 456 is selected for receipt of a benefit at a predetermined future time, and a visual indication 454 appears in the SVE 446 in FIG. 4A. As the predetermined future time approaches, the visual indication 454 approaches the selected virtual player 456, as shown in FIG. 4B. From the perspective of the selected player associated with the virtual player 456, the visual indication 454 appears to be moving directly toward the player, thereby increasing anticipation of the benefit as the predetermined future time approaches.

Figure 5:
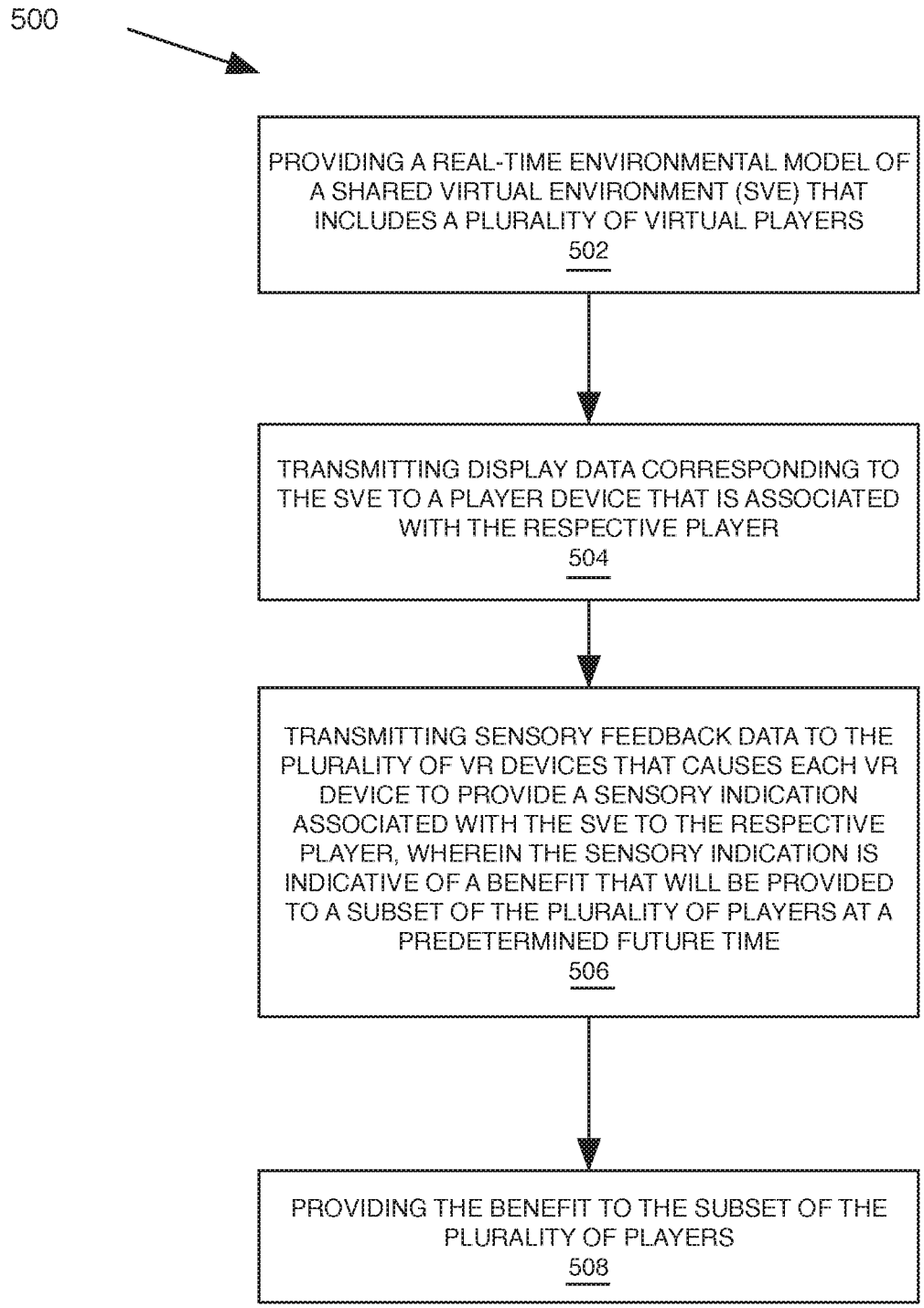
FIG. 5 is a flowchart illustrating operations of systems/methods according to some embodiments.

Referring now to FIG. 5, a flowchart illustrates a method 500 having operations of systems/methods according to some embodiments. Operations may include providing a real-time environmental model of a shared virtual environment (SVE) that includes a plurality of virtual players, each of the plurality of virtual players being associated with a respective player of a wagering game (block 502). Next, for each of the plurality of virtual players, operations may include transmitting display data corresponding to the SVE to a player device that is associated with the respective player, the data including user display data that causes a display in the player device to render a portion of the SVE based on a virtual orientation of the player device and a virtual location of the virtual player in the SVE (block 504). Operations may further include transmitting sensory feedback data to the plurality of VR devices that causes each VR device to provide a sensory indication associated with the SVE to the respective player, wherein the sensory indication is indicative of a benefit that will be provided to a subset of the plurality of players at a predetermined future time (block 506). At the predetermined future time, operations may further include providing the benefit to the subset of the plurality of players (block 508).

Figure 6:
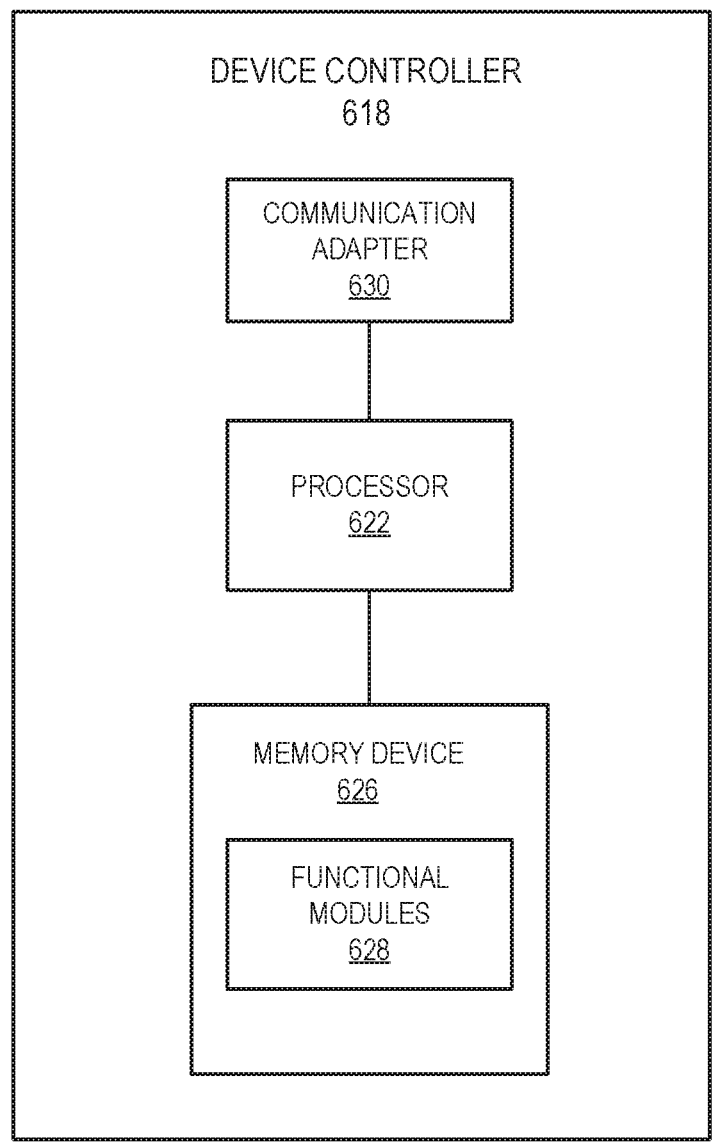
FIG. 6 is a block diagram that illustrates various components of an SVE controller according to some embodiments.

Reference is now made to FIG. 6, which is a block diagram that illustrates various components of an SVE controller 618, similar to the SVE controller 118 of FIG. 1, according to some embodiments. In some embodiments, the SVE controller 618 may be a VR controller or an AR controller. As shown in FIG. 6, the SVE controller 618 may include a processor 622 that controls operations of the SVE controller 618. Although illustrated as a single processor, multiple special purpose and/or general purpose processors and/or processor cores may be provided in the SVE controller 618. For example, the system may include one or more of a video processor, a signal processor, a sound processor and/or a communication controller that performs one or more control functions. The processor 622 may be variously referred to as a "controller," "microcontroller," "microprocessor" or simply a "computer." The processor may further include one or more application-specific integrated circuits (ASICs).

Various components of the SVE controller 618 are illustrated in FIG. 6 as being connected to the processor 622. It will be appreciated that the components may be connected to the processor 622 through a system bus, a communication bus and controller, such as a USB controller and USB bus, a network interface, or any other suitable type of connection.

The SVE controller 618 further includes a memory device 626 that stores one or more functional modules 628 for performing the operations described above.

The memory device 626 may store program code and instructions, executable by the processor 622, to control the SVE controller 618. The memory device 626 may include random access memory (RAM), which can include non-volatile RAM (NVRAM), magnetic RAM (ARAM), ferroelectric RAM (FeRAM) and other forms as commonly understood in the gaming industry. In some embodiments, the memory device 626 may include read only memory (ROM). In some embodiments, the memory device 626 may include flash memory and/or EEPROM (electrically erasable programmable read only memory). Any other suitable magnetic, optical and/or semiconductor memory may operate in conjunction with the gaming device disclosed herein.

The SVE controller 618 may include a communication adapter 630 that enables the SVE controller 618 to communicate with remote devices, such as VR devices and/or a player tracking server 108 (FIG. 1) over a wired and/or wireless communication network, such as a local area network (LAN), wide area network (WAN), cellular communication network, or other data communication network.

Additional Player Device Embodiments

Examples of player devices, such as the player devices 110, 210, and 310 of FIGS. 1-3, for example, may come in many different shapes, sizes, layouts, form factors, and configurations, and with varying numbers and types of virtual input and output devices, and that embodiments of the inventive concepts are not limited to the particular player device features described herein.

The player devices may include virtual versions of any one of slot machines, card table, video poker, roulette, craps, and/or a cash grabber type game.

Player devices may include a number of standard virtual features such as a virtual support structure, housing or cabinet which provides virtual support for virtual displays, inputs, outputs, controls and other features that enable a player to interact with the player devices.

For example, a player device may include virtual display devices, including a primary virtual display device located in a central portion of the virtual cabinet and a secondary virtual display device located in an upper portion of the virtual cabinet. The primary and secondary virtual display devices may be combined into a single virtual display device. The player device may further include a virtual credit display and a virtual bet display. The virtual credit display displays a player's current number of credits, cash, account balance or the equivalent. The virtual bet display displays a player's amount wagered.

The player device may further include a number of virtual input devices that allow a player to provide various inputs to the player device, either before, during or after a game has been played. For example, the player device may include a plurality of virtual input buttons that allow the player to select options before, during or after game play. The player device may further include a virtual game play initiation button and a virtual cashout button. The virtual cashout button is utilized to receive a payment corresponding to a quantity of remaining credits of a virtual credit display.

In some embodiments, one or more virtual input devices of the player device are one or more virtual game play activation devices that are each used to initiate a play of a game on the player device or a sequence of events associated with the player device following appropriate funding of the player device. A player device may include a virtual game play initiation button. It should be appreciated that, in other embodiments, the player device begins game play automatically upon appropriate funding rather than upon utilization of the virtual game play activation device.

In some embodiments, one or more virtual input devices of the player device are one or more virtual wagering or betting devices. One such virtual wagering or betting device is as a maximum wagering or betting device that, when utilized, causes a maximum wager to be placed. Another such virtual wagering or betting device is a repeat the bet device that, when utilized, causes the previously-placed wager to be placed. A further such virtual wagering or betting device is a virtual bet one device. A bet is placed upon utilization of the virtual bet one device. The bet is increased by one credit each time the bet one device is utilized. Upon the utilization of the virtual bet one device, a quantity of credits shown in a virtual credit display (as described below) decreases by one, and a number of credits shown in a virtual bet display (as described below) increases by one. In some embodiments, one or more of the virtual display screens may include a virtual touch-sensitive display.

The virtual display devices are generally configured to display one or more game and/or non-game images, symbols, and indicia. In certain embodiments, the virtual display devices of the player device are configured to display any suitable visual representation or exhibition of the movement of objects; dynamic lighting; video images; images of people, characters, places, things, and faces of cards; and the like. In certain embodiments, the virtual display devices of the player device are configured to display one or more virtual reels, one or more virtual wheels, and/or one or more virtual dice.

The player device also includes various virtual features that enable a player to deposit credits in the player device and withdraw credits from the player device, such as in the form of a payout of winnings, credits, etc. For example, the player device may include virtual representations of a ticket dispenser, a bill/ticket acceptor, and a coin acceptor. The player device may also include a virtual note dispenser configured to dispense paper currency and/or a virtual coin generator configured to dispense coins or tokens in a virtual coin payout tray.

The player device may play audio and display attractive multimedia images displayed on one or more of the virtual display devices audio-visual representation or to otherwise display full-motion video with sound to attract other players in the SVE to the player device and/or to engage the player during gameplay. In certain embodiments, the player device may display a sequence of audio and/or visual attraction messages during idle periods to attract potential players in the SVE to the player device. The videos may be customized to provide any appropriate information.

In some other embodiments, a player device may be implemented as a desktop computer, a laptop personal computer, a personal digital assistant (PDA), portable computing device, or other computerized platform. In some embodiments, the player device may be a virtual handheld device or a virtual mobile device.

Player Tracking

In various embodiments, the gaming system includes one or more player tracking systems under control of the player tracking server 108 shown in FIG. 1. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of virtual player tracking cards. In this embodiment, a player is issued a virtual player identification card that that uniquely identifies the player. The gaming system timely tracks any suitable information or data relating to the identified player's gaming session. The gaming system also timely tracks when the virtual player tracking card is removed to conclude play for that gaming session. In such embodiments, during one or more virtual gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

In some embodiments in which the gaming system includes: a central server, central controller, or remote host through a data network; and/or a plurality of player devices configured to communicate with one another through a data network, the data network is an internet or an intranet. It should be appreciated that the central server, central controller, or remote host and the player device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of player devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A computer-implemented method comprising:
providing a real-time environmental model of a shared virtual environment (SVE) comprising a plurality of virtual players in a first area in the SVE, wherein each virtual player of the plurality of virtual players is associated with a respective player of a plurality of players of a wagering game, wherein each respective player is wearing a respective player device of a plurality of player devices;
transmitting display data corresponding to the SVE to each player device of the plurality of player devices, the display data comprising user display data that causes a display device in the player device to render a portion of the SVE based on a virtual orientation of the player device and a virtual location of the virtual player in the SVE;
transmitting first sensory feedback data to the plurality of player devices that causes each player device to provide to the respective player, at a first time, a first sensory indication moving from a first location in the SVE that is outside the first area to a second location in the SVE that is outside the first area, wherein the second location is closer to the virtual locations of the virtual players than the first location, wherein the first sensory indication is comprises a visual graphic indication of a game benefit that will be provided to a subset of the plurality of players at a predetermined future time after the first time; and
at the predetermined future time, providing the game benefit to the subset of the plurality of players.

2. The computer-implemented method of claim 1, wherein the visual graphic indication comprises a group of animals approaching the plurality of virtual players within the SVE.

3. The computer-implemented method of claim 1, wherein each player device of the plurality of player devices comprises an audio device, and
wherein, for each player device, the first sensory indication comprises an audio indication provided at the audio device.

4. The computer-implemented method of claim 3, wherein the audio indication comprises a sound having a first volume at the first time and a second volume louder than the first volume at a second time, wherein the second time is after the first time and before the future time.

5. The computer-implemented method of claim 3, wherein the audio indication comprises a three-dimensional audio element that simulates a source location in the SVE for the audio indication that is outside the first area.

6. The computer-implemented method of claim 5,
wherein the visual graphic indication comprises a graphical element corresponding to the three-dimensional audio element, wherein the graphical element is positioned at the source location in the SVE for the three-dimensional audio element.

7. The computer-implemented method of claim 6, wherein the graphical element comprises a graphical representation of a cloud,
wherein the three-dimensional audio element comprises a thunder sound effect associated with the cloud,
wherein each player device of the plurality of player devices comprises a haptic feedback device comprising a vibration element, and
wherein the first sensory indication further comprises a rumbling effect provided at the vibration element associated with the thunder sound effect.

8. The computer-implemented method of claim 1, wherein each player device of the plurality of player devices comprises a haptic feedback device, and
wherein, for each player device, the first sensory indication comprises a haptic indication provided at the haptic feedback device.

9. The computer-implemented method of claim 8, wherein the haptic indication comprises a temperature change of the haptic feedback device from a first temperature at the first time to a second temperature at a second time, wherein the second time is after the first time and before the future time.

10. The computer-implemented method of claim 1, wherein the player device comprises a virtual reality (VR) display to provide the first sensory indication so that the player perceives the first sensory indication as being associated with the first location in the SVE in a VR scene in a field of view of the player.

11. The computer-implemented method of claim 1, wherein the player device comprises an augmented reality (AR) display to provide the first sensory indication so that the player perceives the first sensory indication as being associated with a location in a real-world scene in a field of view of the player corresponding to the first location in the SVE.

12. The computer-implemented method of claim 1, wherein the subset of the plurality of players comprises a first subset of players, the method further comprising providing a second game benefit to a second subset of players associated with the first subset of players at the future time.

13. The computer implemented method of claim 1, further comprising:
   determining, after the first time, that the game benefit has not been provided to the subset of the plurality of players; and
   in response to determining that the game benefit has not been provided, transmitting second sensory feedback data to the plurality of player devices that causes each player device to provide a second sensory indication associated with the SVE to the respective player at a second time after the first time and before the future time.

14. A gaming system comprising:
   a memory; and
   a processor circuit coupled to the memory, the memory comprising computer-readable instructions that, when executed by the processor circuit, cause the processor circuit to:
   provide a real-time environmental model of a shared virtual environment (SVE) comprising a plurality of virtual players in a first area in the SVE, wherein each virtual player of the plurality of virtual players is associated with a respective player of a plurality of players of a wagering game, wherein each respective player is wearing a respective player device of a plurality of player devices;
   transmitting display data corresponding to the SVE to each player device of the plurality of player devices, the display data comprising user display data that causes a display in the player device to render a portion of the SVE based on a virtual orientation of the player device and a virtual location of the virtual player in the SVE;
   transmitting first sensory feedback data to the plurality of player devices that causes each player device to provide, at a first time, a first sensory indication to the respective player moving from a first location in the SVE that is outside an outer boundary of the first area to a second location in the SVE that is outside the outer boundary of the first area, wherein the second location is closer to the outer boundary of the first area than the first location, wherein the first sensory indication comprises a visual graphic indication of a game benefit that will be provided to a subset of the plurality of players at a predetermined future time after the first time; and
   at the predetermined future time, providing the game benefit to the subset of the plurality of players.

15. The gaming system of claim 14, wherein each player device of the plurality of player devices comprises an audio device, and
   wherein the first sensory indication comprises an audio indication provided at the audio device.

16. A wearable gaming device comprising:
   a virtual reality (VR) display device;
   a processor circuit; and
   a memory coupled to the processor circuit, the memory comprising computer-readable instructions that, when executed by the processor circuit, cause the processor circuit to:
   receive display data corresponding to a real-time environmental model of a shared virtual environment (SVE) comprising a plurality of virtual players in a first area in the SVE, wherein each virtual player of the plurality of virtual players is associated with one of plurality of players of a wagering game, wherein the plurality of virtual players comprises a first player wearing the gaming device and a second player wearing a VR player device,
   wherein the display data comprises user display data that causes the display device to render a portion of the SVE based on a virtual orientation of the wearable gaming device and a virtual location of the virtual player in the SVE so that the first player perceives the SVE as being associated with a real world scene being viewed by the first player;
   receive first sensory feedback data that causes the gaming device to provide, at a first time, a visual graphical indication to the first player moving from a first location in the SVE that is outside an outer perimeter of the first area to a second location in the SVE that is outside an outer perimeter of the first area, wherein the second location is closer to the outer perimeter of the first area than the first location, wherein the visual graphical indication is indicative of a game benefit that will be provided to a subset of the plurality of players at a predetermined future time after the first time; and
   at the predetermined future time, receive an indication that the game benefit has been provided to the subset of the plurality of players,
   wherein the game benefit is selected from the group consisting of a bonus game, a multiplier for the next wagered spin, and a number of free spins.

\* \* \* \* \*